US008522032B2

(12) United States Patent

Strein

(10) Patent No.: US 8,522,032 B2
(45) Date of Patent: Aug. 27, 2013

(54) SYSTEM AND METHOD TO PREVENT AUDIO WATERMARK DETECTION

(75) Inventor: Michael J. Strein, Oakdale, NY (US)

(73) Assignee: Disney Enterprises, Inc., Burbank, CA (US)

( * ) Notice: Subject to any disclaimer, the term of this patent is extended or adjusted under 35 U.S.C. 154(b) by 741 days.

(21) Appl. No.: 12/749,740

(22) Filed: Mar. 30, 2010

(65) Prior Publication Data

US 2011/0243327 A1 Oct. 6, 2011

(51) Int. Cl.
*H04L 9/32* (2006.01)

(52) U.S. Cl.
USPC .......................................... 713/176; 380/253

(58) Field of Classification Search
USPC .......................................... 380/253; 713/176
See application file for complete search history.

(56) References Cited

U.S. PATENT DOCUMENTS

| | | | | |
|---|---|---|---|---|
| 6,442,283 | B1 * | 8/2002 | Tewfik et al. | 382/100 |
| 7,031,493 | B2 | 4/2006 | Fletcher et al. | |
| 7,206,649 | B2 | 4/2007 | Kirovski et al. | |
| 7,266,697 | B2 | 9/2007 | Kirovski et al. | |
| 7,272,718 | B1 * | 9/2007 | Matsumura et al. | 713/176 |
| 7,299,189 | B1 * | 11/2007 | Sato | 704/500 |
| 2003/0026422 | A1 * | 2/2003 | Gerheim et al. | 380/210 |
| 2004/0120523 | A1 * | 6/2004 | Haitsma et al. | 380/239 |
| 2006/0251252 | A1 * | 11/2006 | Quan | 380/204 |
| 2008/0209219 | A1 * | 8/2008 | Rhein | 713/176 |

OTHER PUBLICATIONS

Byeong-Seob Ko, et al.; Log Scaling Watermark Detection in Digital Audio Watermarking; REIC/GSIS, Tohoku University, 2-1-1 Katahira, Aoba-ku, Sendai, Japan; ICASSP, pp. III-81 to III-84, IEEE 2004.
An Affine Resistant Watermarking Scheme for Audio Signals; http://www.cmlab.csie.ntu.edu.tw/~dynamic/AWM/index.html; pp. 1-3.
p2pnet; Stealthy Audio Watermarking: DRM; http://222.p2pnet/story/13310; pp. 1-7, Sep. 2007.
Joseph R. Kardamis; Audio Watermarking Techniques Using Singular Value Decomposition; Rochester Institute of Technology; Jun. 5, 2007; pp. 1-81.
Martin Steinebach et al.; StirMark Benchmark: Audio watermarking attacks; IEEE 2001; pp. 49-54.

* cited by examiner

*Primary Examiner* — Cordelia Zecher
(74) *Attorney, Agent, or Firm* — Farjami & Farjami LLP

(57) ABSTRACT

A system to prevent audio watermark detection includes content having a video portion and an audio portion, the audio portion having a watermark, an audio/video separator configured to separate the video portion and the audio portion, and a random number generator configured to generate a random number corresponding to a shifted frequency. The system also includes a frequency shift element configured to apply the shifted frequency to the audio portion to alter a spectrum of the watermark so as to prevent detection of the watermark by a device seeking to recover the watermark. The system also includes an audio resampler configured to resample the audio portion to restore the audio portion to an original length, and an audio/video combiner configured to combine the video portion and the audio portion.

19 Claims, 6 Drawing Sheets

SYSTEM AND METHOD TO PREVENT AUDIO WATERMARK DETECTION

BACKGROUND

Digital watermarking is a technology which allows undetectable information to be hidden in an electronic file. The presence of the watermark is not apparent to a user and generally does not negatively affect the electronic file to which it is added. The watermark information is typically used to identify the originator of the electronic file, but can be used for other purposes, such as to confirm a legitimate user of the electronic file, to determine whether certain content has been aired or played, or many other uses.

Digital audio watermarking conceals a watermark in a digital audio file. In many instances, the digital audio file is a discrete audio file. In some instances, digital audio watermarks are being used by entities in the television transmission area to provide revenue outside of agreements between broadcasters and television networks or studios. Many times, a broadcaster or television network would like to know whether content supplied by such an entity contains an audio watermark and to prevent detection of an audio watermark by a third party device.

There are a number of different methodologies available to conceal an audio watermark in an audio file. Some of these methodologies include direct current (DC) watermarking, phase encoding, spread spectrum watermarking and echo watermarking. Direct current (DC) watermarking involves concealing the watermark data in lower frequency components of an audio signal. The lower frequency components are below the threshold of human perception.

Phase encoding conceals the watermark data by encoding the watermark data in an artificial phase signal. Spread spectrum watermarking uses direct sequence spread spectrum (DSSS) to spread the watermark data signal over the entire audible frequency spectrum such that it approximates white noise. Echo watermarking conceals watermark data by distorting an audio signal in a way that causes the human auditory system to perceive the watermarked audio file as environmental distortion. Spread spectrum watermarking is one of the more widely used digital audio watermarking techniques.

These watermarking methodologies generally require complex systems to implement and detect. Therefore, there is a need for a way of efficiently and easily preventing audio watermark detection.

SUMMARY

Embodiments of a system to prevent audio watermark detection include content having a video portion and an audio portion, the audio portion having a watermark, an audio/video separator configured to separate the video portion and the audio portion, and a random number generator configured to generate a random number corresponding to a shifted frequency. The system also includes a frequency shift element configured to apply the shifted frequency to the audio portion to alter a spectrum of the watermark so as to prevent detection of the watermark by a device seeking to recover the watermark. The system also includes an audio resampler configured to resample the audio portion to restore the audio portion to an original length, and an audio/video combiner configured to combine the video portion and the audio portion.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

The system and method to prevent audio watermark detection can be implemented in a number of systems, including in a video server. While the system and method to prevent audio watermark detection will be described herein as being implemented in a video playout server located at a network, the system and method to prevent audio watermark detection can be implemented in any device that processes an audio signal that may contain an audio watermark.

The system and method to prevent audio watermark detection can be implemented in hardware, software, or a combination of hardware and software. When the system and method to prevent audio watermark detection is implemented in software, as in one or more preferred embodiments, the software processes an audio file to alter a spectrum of the watermark so as to prevent a device from detecting the watermark. The software can be stored in a memory and executed by a suitable instruction execution system (e.g., a microprocessor).

The software for the system and method to prevent audio watermark detection comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

Figure 1:
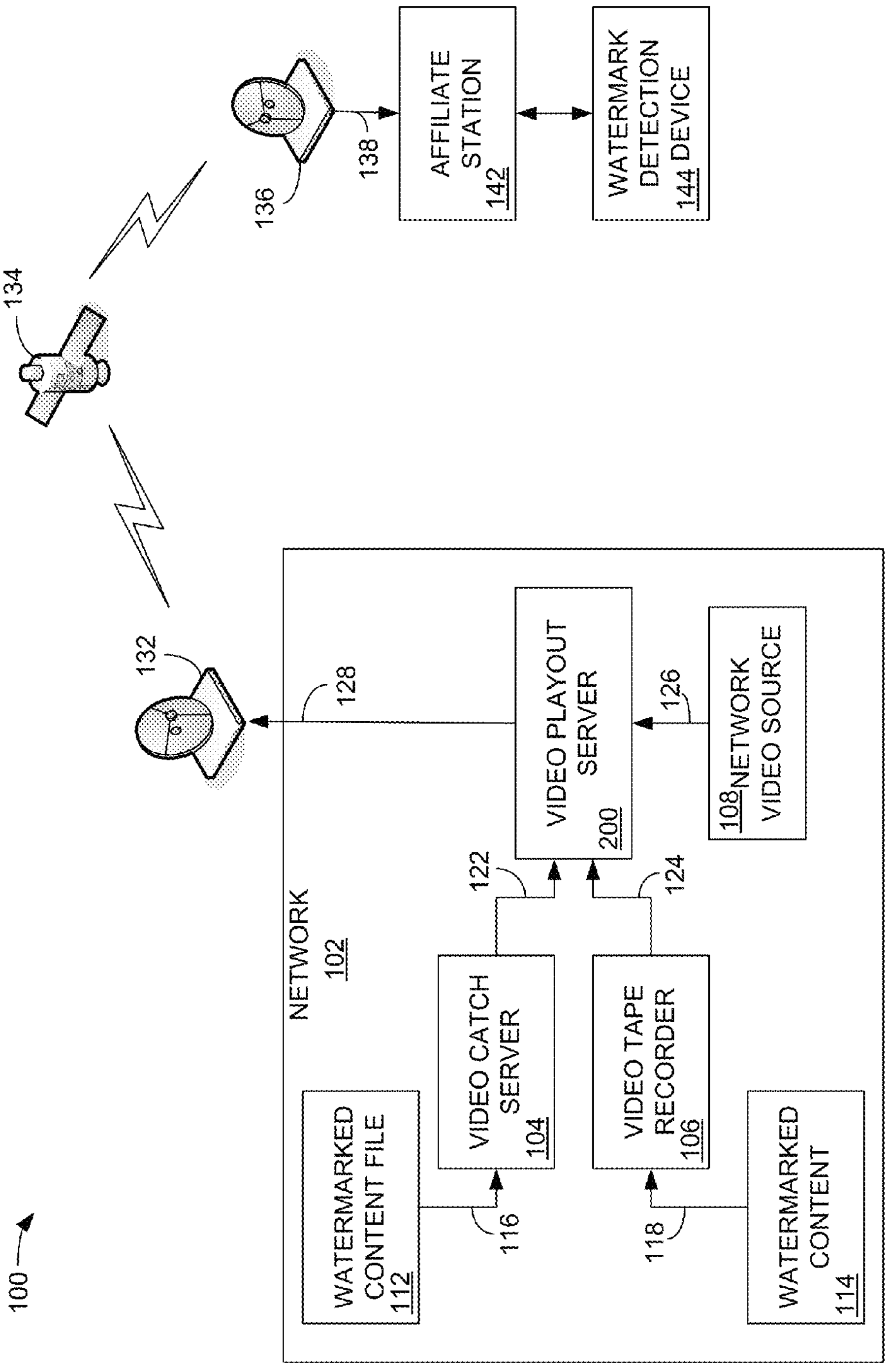
FIG. 1 is a block diagram illustrating an embodiment of a system that can implement the system and method to prevent audio watermark detection.

FIG. 1 is a block diagram illustrating an embodiment of a system 100 that can implement the system and method to prevent audio watermark detection. The system 100 includes a television network 102, within which embodiments of the system and method to prevent audio watermark detection may be implemented. Although not necessary to implement the system and method to prevent audio watermark detection, the system 100 also includes a transmission system including a satellite communication uplink station 132, a communication satellite 134, a satellite communication downlink station 136, an affiliate station 142, and a device 144 that is intended to detect the presence of the watermark. The device 144 can be any downstream device that can be used to detect the presence of a watermark. In an embodiment, the device 144 can be a third-party device, the goal of which is to detect the watermark without the knowledge of the network 102 or the affiliate station 142. Details of the transmission system, including the satellite communication uplink station 132, the communication satellite 134, and the satellite communication downlink station 136, which can be capable of bi-directional communication, are not described herein as they are known to those skilled in the art. Further, other transmission systems, such as, for example, terrestrial transmission systems, wired or wireless transmission systems, or other transmission systems, can be implemented with the system and method for audio watermark removal.

The network 102 includes a network video source 108, which provides network video source programming to a video playout server 200 over connection 126. The video playout server 200 processes the network video programming and provides the network video programming over connection 128. The signal on connection 128 is a network audio/video feed and is provided to the satellite communication uplink station 132 for transmission.

The video playout server 200 includes an embodiment of the system and method to prevent audio watermark detection. In accordance with an embodiment of the system and method to prevent audio watermark detection, the video playout server 200 receives content that includes an audio watermark. The content that includes an audio watermark can be in the form of a watermarked content file 112, in the form of watermarked content 114, or any other watermarked content. The watermarked content file 112 is typically an electronic file that includes electronic content having an audio portion and a video portion. The audio portion may include an audio watermark. As an example, the watermarked content file 112 can be a television commercial, or other content, that is provided to the network 102 as an Internet Protocol (IP) file, or any other type of electronic file.

The watermarked content 114 is typically an analog or digital tape that includes content having an audio portion and a video portion. The audio portion may include an audio watermark. As an example, the watermarked content 114 can be a television commercial, or other content, that is provided to the network 102 in the form of a video tape.

The watermarked content file 112 is provided to a video catch server 104 over connection 116. The video catch server 104 can be implemented as a computing device that receives the electronic files representing the watermarked content file 112 via the World Wide Web (WWW), via a dedicated IP connection, or via another suitable connection. The video catch server 104 provides the watermarked content file 112 over connection 122 to the video playout server 200. The connection 122 can be implemented as an IP data connection, or another suitable data connection.

The watermarked content 114 is provided to a video tape recorder 106 over connection 118. The video tape recorder 106 can be implemented as a dedicated video tape playback device that plays the watermarked content 114 when the watermarked content 114 is provided via a conventional video tape. The video tape recorder 106 provides the watermarked content 114 over connection 124 to the video playout server 200. The connection 124 can be implemented as an audio/video connection, or another suitable connection.

Figure 2:
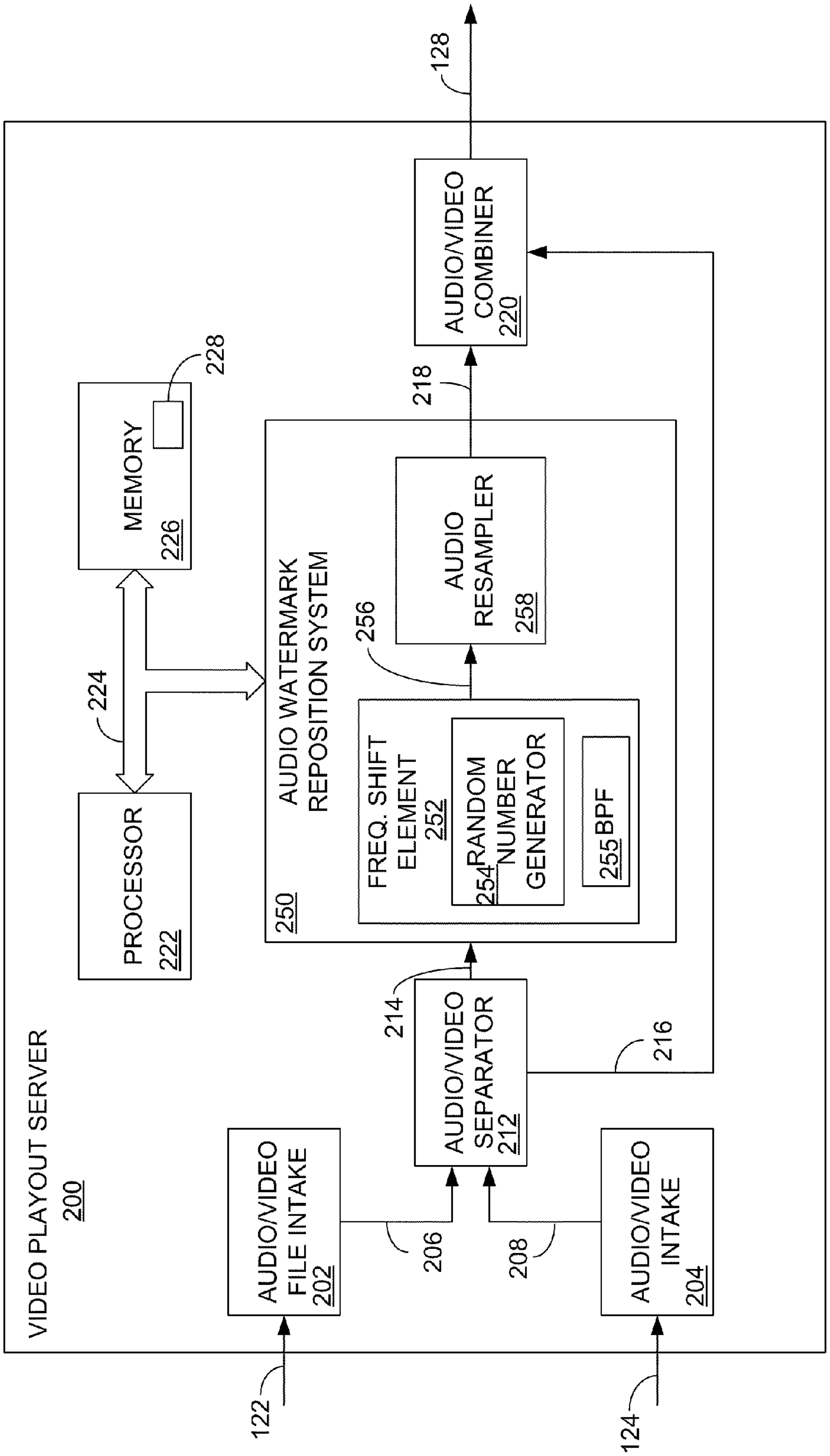
FIG. 2 is a block diagram illustrating an embodiment of the video playout server of FIG. 1.

FIG. 2 is a block diagram illustrating an embodiment of the video playout server 200 of FIG. 1. The video playout server 200 is a non-limiting example of a device in which the system and method to prevent audio watermark detection can be implemented. The video playout server 200 includes a processor 222, a memory 226 and audio watermark reposition system 250, coupled together over a system interface 224. The system interface 224 can be, for example, a multiplexed system bus with discrete and/or multiple connections. In an embodiment, the audio watermark reposition system 250 is a software element that can be stored in the memory 226 and executed by the processor 222. Alternatively, portions of the audio watermark reposition system 250 can be stored in the memory 226, in other dedicated or non-dedicated memory, or can be distributed over other elements. The processor 222 may also control other functions of the video play out server 200 which are not shown for simplicity.

The video playout server 200 includes an audio/video file intake element 202, which receives the output of the video catch server 104 (FIG. 1) over connection 122, when the watermarked content is provided as an electronic file. The video playout server 200 also includes an audio/video intake element 204, which receives the output of the video tape recorder 106 (FIG. 1) over connection 124 when the watermarked content is provided as a conventional audio/video tape.

When the watermarked content is provided as an electronic file, such as the watermarked content file 112, the audio/video file intake element 202 processes the watermarked content file 112 and provides an electronic version of the watermarked content file 112 over connection 206 to the audio/video separator 212. In an embodiment, the audio/video file intake element 202 can be, for example, an Ethernet IP data connection through which the watermarked content file 112 is introduced to the video playout server 200 in its native format and stored in the memory 226.

When the watermarked content is provided conventionally as an audio/video segment on tape, the audio/video intake element of 204 processes the watermarked content 114 and provides the audio and video of the watermarked content 114 to the audio/video separator 212 over connection 208. In an embodiment, the audio/video intake element 204 can be, for example, an SDI (Serial Digital Interface) audio/video connection that presents the watermarked content 114 in a real-time audio/video stream. A file 228 is created on the video playout server 200, typically in the memory 226 and the watermarked content 114 is captured into that file 228. Depending on the resolution of the video playout server 200, the audio/video content may be re-sampled to a lower or higher resolution (bit-depth).

The audio/video separator 212 separates the content into an audio portion and a video portion and provides the audio portion over connection 214 to the audio watermark reposition system 250. The video portion is provided over connection 216 such that it bypasses the audio watermark reposition system 250. The function of the audio/video separator 212 is the same regardless of whether or not the audio is watermarked or whether or not the audio is delivered as part of a streaming audio/video stream or as a file.

The audio watermark reposition system 250 includes a frequency shift element 252, and an audio resampler 258. The frequency shift element 252 includes a random number generator 254 and a band pass filter (BPF) 255. In accordance with an embodiment of the system and method to prevent audio watermark detection, the random number generator 254 is used to generate a random number that corresponds to an analog or digital frequency shift. The frequency shift is applied to the watermarked audio portion on connection 214 by the frequency shift element 252. If the audio signal on connection 214 includes an audio watermark, the application of the frequency shift will alter a spectrum of the watermark so as to prevent detection of the watermark by the device 144 (FIG. 1). The spectrum of the watermark can be altered in the time domain by changing a duration of the watermarked content and the included watermark; or by shifting a frequency of a watermarked content to relocate the watermark in the frequency domain to a different portion of the frequency spectrum so as to prevent detection of the watermark by downstream equipment, such as device 144 of FIG. 1, seeking to recover the watermark.

In an embodiment, the frequency shift is continuously variable in that the random number generator 254 can continually generate different random numbers so as to discretely change and/or continuously vary the frequency shift. For example, the randomly generated number, and corresponding time or frequency shift can vary on the order of 0.2%, 0.4%, etc, or according to other orders. The frequency shift applied to the audio portion by the frequency shift element 252 can be applied in the time domain or in the frequency domain. With regard to a time domain frequency shift, the duration of the audio portion is changed. This change in duration can be expressed as expanding or contracting the length of the audio portion by a desired percentage. For example, a 30 second (900 frames of video at 30 frames per second) audio portion expanded by, for example, 0.2% would have an approximate duration of 30 seconds and 2 frames, or 30.066 seconds. Changing the duration of the audio portion also changes the duration of a watermark located within the audio portion. Changing the duration of the watermark changes the wavelength of the watermark, which changes the frequency of the watermark, thereby corrupting the watermark and making detection difficult.

With regard to a frequency domain shift, the audio portion is typically passed through the bandpass filter 255 to select the frequency range of audio to shift. For example, a typical filter pass band can be 0 to 5 Kilohertz (KHz). The construction of a bandpass filter having a pass band of 0 to 5 KHz is known to those skilled in the art. Then, the frequency of the audio portion can be shifted by a percentage of the pass band. For example, 0.2% of a 5 KHz pass band would equate to a frequency shift of approximately 10 Hz, thereby relocating the watermark in frequency and making detection improbable.

The audio signal having the spectrum of the audio watermark altered is provided over connection 256 to an audio resampler 258. The audio resampler 258 resamples the audio to return the audio portion on connection 256 to the proper length. For example, the audio resampler 258 can resample the audio portion on connection 256 at a 48 kHz sampling rate to restore the audio portion to its original length. While other resampling frequencies can be used, 48 KHz is a generally accepted frequency sampling rate for audio/video servers. Other frequency sampling rates exist for other applications such as 44 KHz for CD authoring. This process would work equally well in those domains.

The resampled audio signal is provided over connection 218 to an audio/video combiner 220. The audio/video combiner 220 combines the video signal on connection 216 with the resampled audio signal on connection 218 and provides the combined signal over connection 128.

Figure 3:
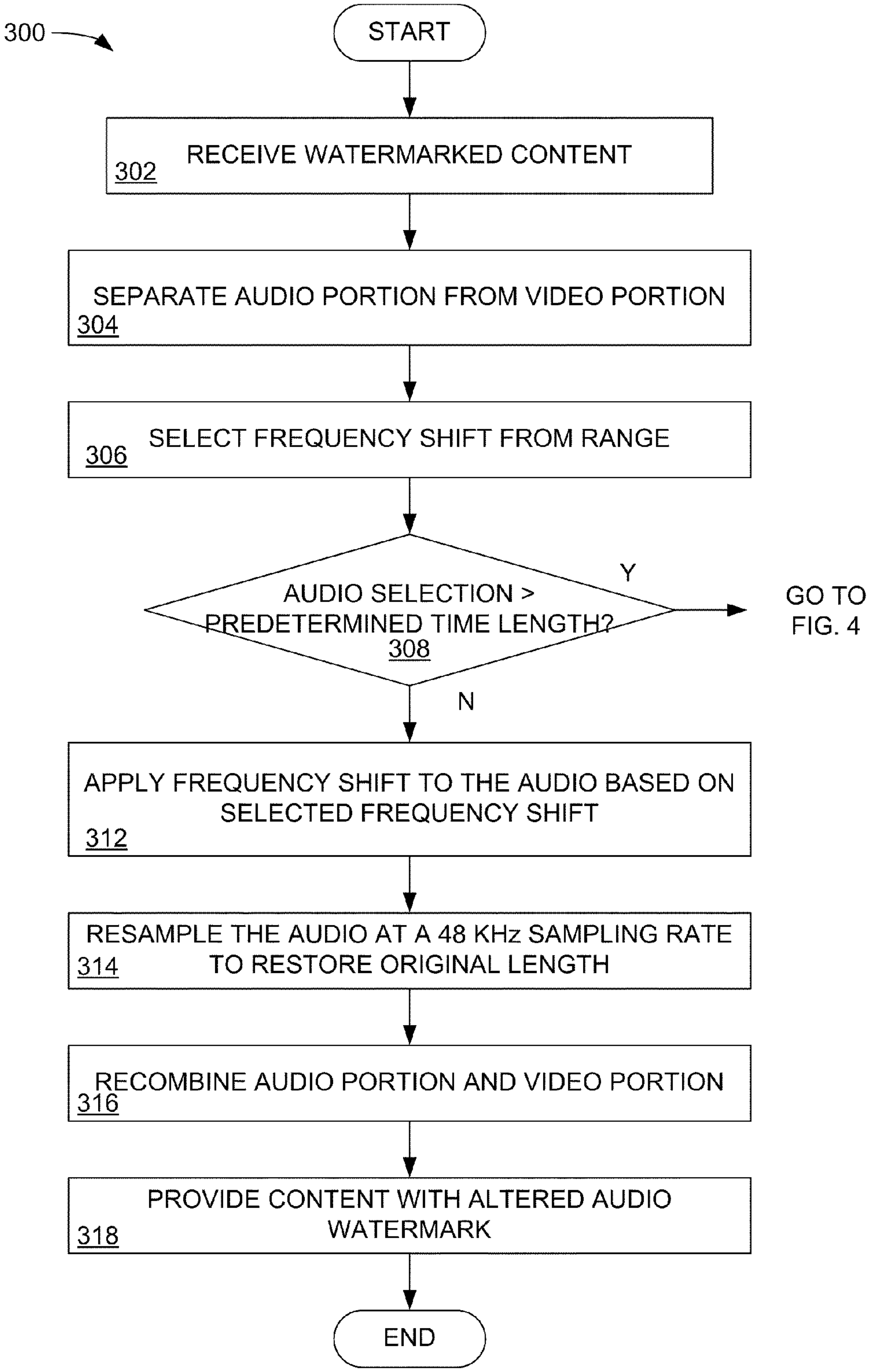
FIG. 3 is a flowchart describing the operation of an embodiment of a method to prevent audio watermark detection.

FIG. 3 is a flowchart describing the operation of an embodiment of a method to prevent audio watermark detection. The blocks in the flowchart 300 can be performed in or out of the order shown, and in some instances can be performed in parallel.

In block 302, watermarked content is received by the video playout server 200. The watermarked content can be in the form of a program element file, such as the watermarked content file 112 (FIG. 1), or in the form of a conventional video tape, such as the watermarked content 114 (FIG. 1), or in any other type of watermarked content. In block 304, the audio video separator 212 separates the audio portion from the video portion of the content.

In block 306, the random number generator 254 is used to generate a random number that corresponds to a frequency shift. The frequency shift is selected from a predetermined range, and can be, for example, a percentage of the duration of the audio portion, or can be a percentage of the frequency pass band of the audio portion. In an embodiment, the random number generator 254 selects a number from a range of numbers. The range of numbers correlates to a series of preselected frequency shifts that would then be applied to the watermarked audio content. As mentioned above, the frequency shifts can be, for example, a percentage of the duration of the audio portion (e.g., 0.2%) or a percentage of the pass band of the audio portion (e.g., 0.2% of a 5 KHz pass band). Other percentages can be applied, depending on application.

In block 308, it is determined whether the audio portion, also referred to as the audio selection, exceeds a predetermined length. Depending on the length of the audio portion, one or more different frequency shifts might be applied to different portions of the selected audio portion to alter a spectrum of watermark. A typical predetermined length of time for the audio portion may be one minute. However, other predetermined periods of time are possible. If it is determined in block 308 that the audio selection does not exceed the predetermined length of time, which can be, for example one minute, then, in block 312, the frequency shift element 252 applies a the frequency shift to the audio portion based on the frequency shift selected in block 306. Applying the frequency shift to an audio portion that contains an audio watermark alters a spectrum of the watermark, thus making subsequent detection of the audio watermark by the device 144 (FIG. 1) difficult.

Figure 5A:
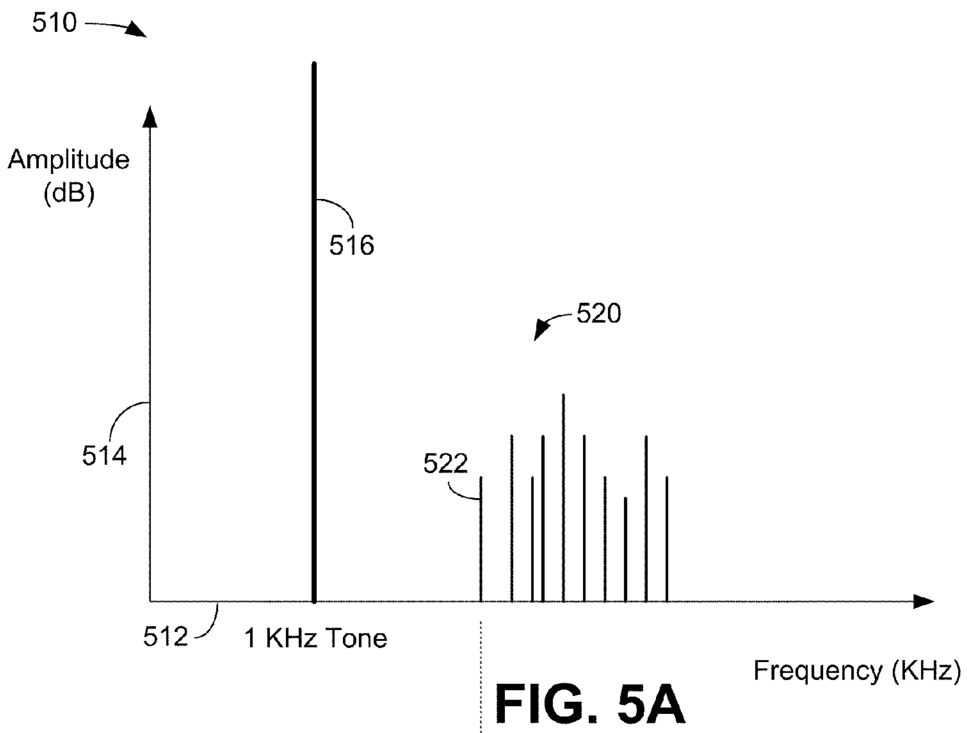
FIGS. 5A and 5B are graphical illustrations showing how the spectrum of an audio watermark is altered in frequency by the audio watermark reposition system of FIG. 2.
Figure 5B:
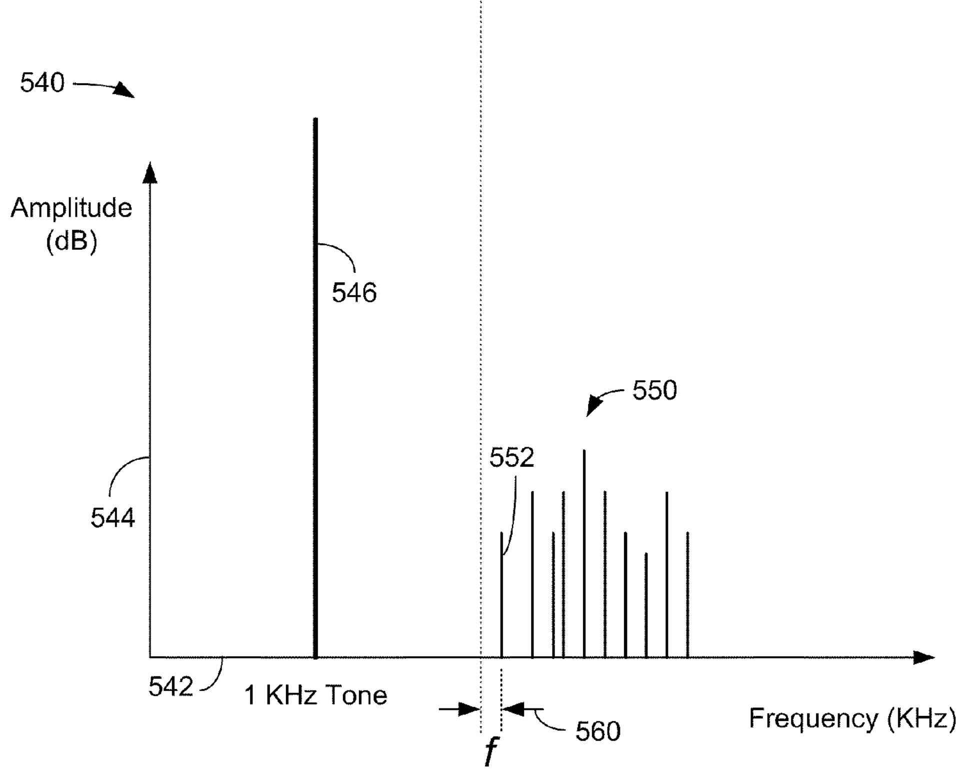

FIGS. 5A and 5B are graphical illustrations showing how the spectrum of an audio watermark is altered in frequency by the audio watermark reposition system of FIG. 2. FIG. 5A shows a graphical illustration 510 in which the abscissa 512 represents frequency in KHz, in this example, and the ordinate 514 represents amplitude in dB. A 1 KHz tone 516 is shown for reference. A series of watermark tones 520 is located in the approximate 3-5 KHz frequency range, with a specific watermark tone 522 shown as an example. FIG. 5B shows a graphical illustration 540 in which the abscissa 542 represents frequency in KHz, in this example, and the ordinate 544 represents amplitude in dB. A 1 KHz tone 546 is shown for reference. A series of watermark tones 550 is located in the approximate 3-5 KHz frequency range, with a specific watermark tone 552 shown as an example. However, by operation of the frequency shift element 252 (FIG. 2), the series of watermark tones 550 is repositioned, also referred to as shifted in frequency, with respect to the series of watermark tones 520. As a specific example, the watermark tone 552 is shifted in frequency relative to the watermark tone 522 by an amount, f, (e.g., 10 KHz as in the example above) shown at reference numeral 560. The frequency shift, f, corresponds to the frequency shift determined by the frequency shift element 252.

The magnitude of the frequency shift between the watermark tone 552 and the watermark tone 522 (and similarly, the series of watermark tones 550 relative to the series of watermark tones 520) is determined by the value of the frequency shift determined in block 306 and applied to the audio portion in block 312. In this manner, the watermark tone 552 (and all the watermark tones in the series of watermark tones 550) appears at a frequency that is different than the original frequency, which makes detection by an external device (e.g., device 144 of FIG. 1) highly improbable. The amount of frequency shift between the watermark tone 552 and the watermark tone 522 is variable and can be determined by the frequency shift as determined by the random number generator 254 and applied by the frequency shift element 252.

Figure 6A:
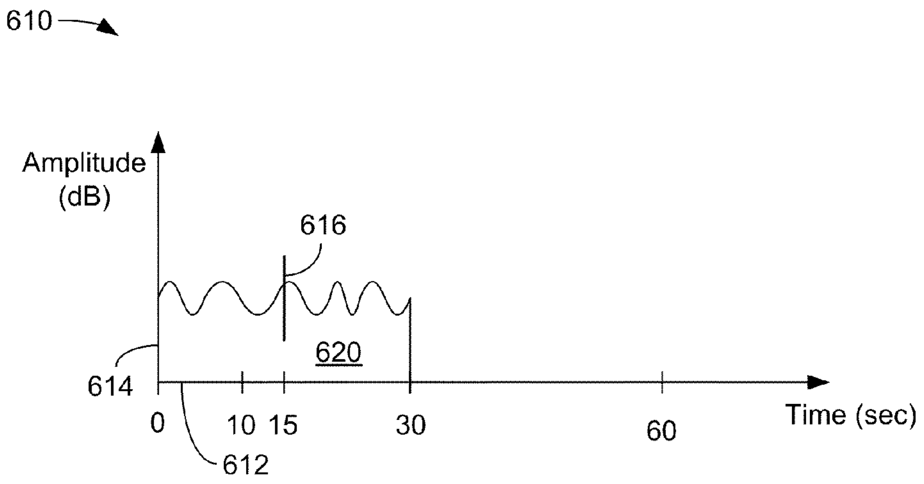
FIGS. 6A and 6B are graphical illustrations showing how the spectrum of an audio watermark is altered in time by the audio watermark reposition system of FIG. 2.
Figure 6B:
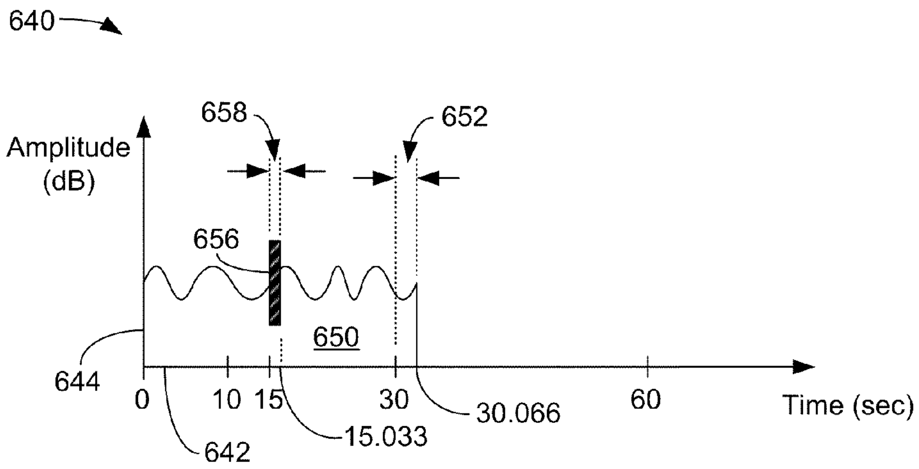

FIGS. 6A and 6B are graphical illustrations showing how the spectrum of an audio watermark is altered in time by the audio watermark reposition system of FIG. 2.

FIG. 6A shows a graphical illustration 610 in which the abscissa 612 represents time in seconds (sec), in this example, and the ordinate 614 represents amplitude in dB. An audio segment having a duration of 30 seconds is represented using reference numeral 620. The audio segment 620 includes a watermark 616 located at a position that is 15 seconds from the beginning of the audio segment 620.

FIG. 6B shows a graphical illustration 640 in which the abscissa 642 represents time in seconds, in this example, and the ordinate 644 represents amplitude in dB. In FIG. 6B, the duration of the audio segment 620 (FIG. 6A) has been changed, resulting in the audio segment 650 in FIG. 6B. In the embodiment shown in FIG. 6B, the audio segment 650 has been lengthened (e.g., expanded) by approximately 0.2%. However, the audio clip 650 could also have been lengthened by a different amount, or could have been shortened (e.g., compressed) by a similar 0.2% or by another amount. Changing the duration of the audio segment 650 with respect to the duration of the audio segment 620 (FIG. 6A) also changes the duration of the watermark 616 (FIG. 6A), such that the frequency of the watermark 616 is altered, thereby corrupting the watermark and making detection difficult.

In the example shown in FIG. 6B, the length of the audio segment 620 is lengthened by approximately 0.2%, which, for a 30 second segment where there are 900 frames of video at 30 frames per second, corresponds to two (2) frames. For a system in which there are 30 frames per second, each frame is approximately 0.033 seconds in duration. Therefore, the length of the audio segment 650 is 30.066 seconds, with the additional duration of 0.066 seconds shown at 652.

The spectrum of the watermark 656 is also expanded in time so that the duration of the watermark 656 is lengthened by 0.033 seconds, illustrated at 658. In this manner, the frequency of the watermark 656 is sufficiently altered so as to corrupt the watermark, thereby making detection difficult.

Returning now to FIG. 3, in block 314, the audio resampler 258 resamples the audio using, for example, a 48 KHz sampling rate, to restore the audio portion to its original length. In block 316, the audio/video combiner 220 recombines the audio portion and the video portion. In block 318, the video playout server 200 provides the content having the spectrum of the audio watermark altered over connection 128.

Figure 4:
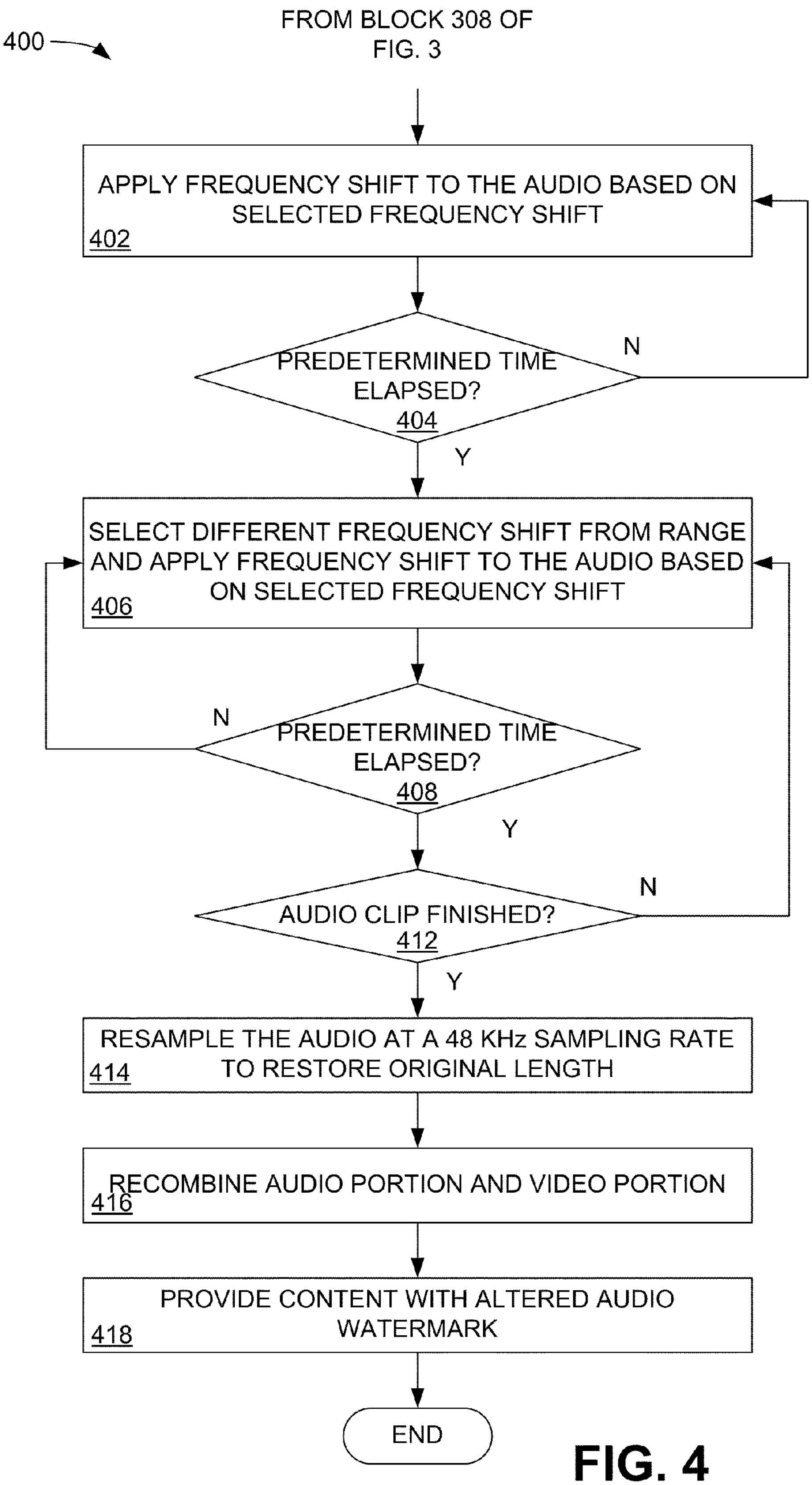
FIG. 4 is a flowchart describing the operation of an alternative embodiment of the method to prevent audio watermark detection.

If, in block 308 it was determined that the audio selection exceeds the predetermined length of time, then, the process proceeds to FIG. 4.

FIG. 4 is a flowchart describing the operation of an alternative embodiment of the method for audio watermark removal. Most often, audio watermarks are applied to interstitial material, such as relatively short duration commercials or promotional clips, etc. Such watermark application is typically done in a subversive manner to track content without the distributor's consent. Longer form content is usually watermarked to protect the rightsholder of the content. The system and method to prevent audio watermark detection is generally intended to apply to the shorter content, such as commercials and promotional materials, and not to the longer content where the watermark is used to protect the originator of the content. However, the system and method to prevent audio watermark detection can adapt to situations in which the downstream device may adapt to single shifts in frequency. Accordingly, FIG. 4 describes an embodiment in which the system and method to prevent audio watermark detection can adapt to variable shifts in frequency.

In block 402, the frequency shift element 252 applies a frequency shift to the audio portion based on the frequency shift selected in block 306. Applying the frequency shift to an audio portion that contains an audio watermark alters a spectrum of the watermark, thus making subsequent detection of the audio watermark by the device 144 (FIG. 1) difficult, as described above.

In block 404 is determined whether the predetermined time period has elapsed. If the predetermined time period has not elapsed, then the process returns to block 402. If it is determined in block 404 that the predetermined time period has elapsed, then, in block 406, the random number generator 254 is used to generate a different random number that corresponds to a different frequency shift, and the frequency shift element 252 applies the different frequency shift to the audio portion based on the newly selected frequency shift.

In block 408 it is determined whether the predetermined time period has elapsed, if the predetermined time period has not elapsed, then the process returns to block 406. If it is determined in block 408 that the predetermined time period has elapsed, then, in block 412 it is determined whether the audio clip is complete. If it is determined in block 412 that the audio clip is not complete, then the process returns to block 406. If it is determined in block 412 that the audio clip is complete, then the process proceeds to block 414, where the audio portion is resampled using a sampling rate of 48 KHz to restore the audio clip to its original length. In block 416, the audio/video combiner 220 recombines the audio portion and the video portion. In block 418, the video playout server 200 provides the content having the spectrum of the audio watermark altered over connection 128.

While various embodiments of the invention have been described, it will be apparent to those of ordinary skill in the art that many more embodiments and implementations are possible that are within the scope of the invention.

What is claimed is:

1. A system to prevent audio watermark detection, comprising:

content having a video portion and an audio portion, the audio portion having a watermark;

an audio/video separator configured to separate the video portion and the audio portion;

a random number generator configured to generate a random number corresponding to a shifted frequency;

a frequency shift element configured to apply the shifted frequency to the audio portion to alter a spectrum of the watermark so as to prevent detection of the watermark by a device seeking to recover the watermark;

an audio resampler configured to resample the audio portion to restore the audio portion to an original length; and an audio/video combiner configured to combine the video portion and the audio portion.

2. The system of claim 1, in which the shifted frequency is generated randomly.

3. The system of claim 1, in which the shifted frequency is variable.

4. The system of claim 1, in which the shifted frequency is continuously variable.

5. The system of claim 1, in which content is an electronic file.

6. The system of claim 1, in which the audio resampler operates at a 48 KHz sampling rate.

7. The system of claim 1, in which the spectrum of the watermark is altered with respect to time.

8. The system of claim 1, in which the spectrum of the watermark is altered with respect to frequency.

9. A video server, comprising:

content having a video portion and an audio portion, the audio portion having a watermark;

an audio/video separator configured to separate the video portion and the audio portion;

a random number generator configured to generate a random number corresponding to a shifted frequency;

a frequency shift element configured to apply the shifted frequency to the audio portion to alter a spectrum of the watermark so as to prevent detection of the watermark by a device seeking to recover the watermark;

an audio resampler configured to resample the audio portion to restore the audio portion to an original length; and an audio/video combiner configured to combine the video portion and the audio portion.

10. The system of claim 9, in which the shifted frequency is generated randomly.

11. The system of claim 9, in which the shifted frequency is variable.

12. The system of claim 9, in which the shifted frequency is continuously variable.

13. The system of claim 9, in which content is an electronic file.

14. The system of claim 9, in which the audio resampler operates at a 48 KHz sampling rate.

15. A method to prevent audio watermark detection, comprising:

receiving content having a video portion and an audio portion, the audio portion having a watermark;

separating the video portion and the audio portion;

generating a shifted frequency;

applying the shifted frequency to the audio portion to alter a spectrum of the watermark in at least one of time and frequency so as to prevent detection of the watermark by a device seeking to recover the watermark;

resampling the audio portion to restore the audio portion to an original length; and combining the video portion and the audio portion.

16. The method of claim 15, in which the shifted frequency is generated randomly.

17. The method of claim 15, in which the shifted frequency is variable.

18. The method of claim 15, in which the shifted frequency is continuously variable.

19. The method of claim 15, in which content is received as an electronic file.

* * * * *